Figure 1:
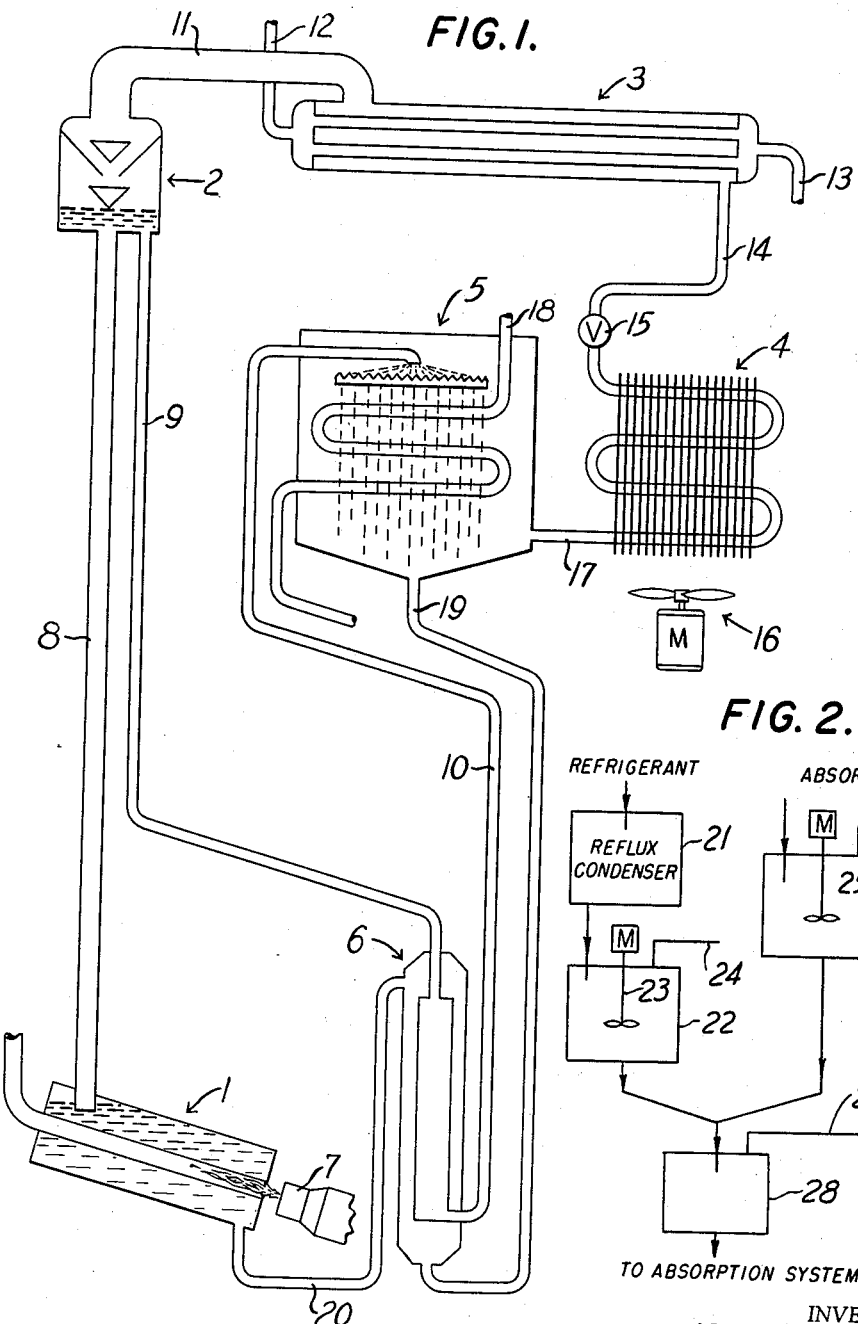

Oct. 20, 1959  N. E. AF KLEEN ET AL  2,909,041
ABSORPTION REFRIGERATION SYSTEM AND METHOD OF TREATING THE SAME
Filed Feb. 27, 1957

INVENTORS
NILS E. AFKLEEN
WILLIAM J. POEHLMAN
BY Andrus & Scales
Attorneys

United States Patent Office 2,909,041
Patented Oct. 20, 1959

2,909,041

ABSORPTION REFRIGERATION SYSTEM AND METHOD OF TREATING THE SAME

Nils E. af Kleen and William J. Poehlman, Milwaukee, Wis., assignors to A. O. Smith Corporation, Milwaukee, Wis., a corporation of New York Application February 27, 1957, Serial No. 642,749

2 Claims. (Cl. 62—77)

This invention relates to an absorption refrigeration system in which at least two working substances are used, a refrigerant and an absorbent, and a process of preparing or treating these substances before they are charged into the unit or system.

In a continuous cycle absorption system the refrigerant and the mixture of the refrigerant and the absorbent, the latter generally called the solution, are in the liquid phase during all the operating conditions. The pure absorbent may be a solid, but the absorbent solution will be liquid.

According to the invention, the refrigerant and absorbent are treated to substantially remove the entrained moisture and air that may be present in these materials and thereby increase the efficiency of the system. After the refrigeration system is charged with the refrigerant and the absorbent and air and moisture have been removed to a predetermined value in accordance with the invention, the pressures in the refrigeration system correspond to the true value of the refrigerant and the solution. If, however, the air and moisture contents are not reduced below a predetermined value, noncondensible gases occur which besides causing corrosion collect in the condenser and in the absorber and have to be purged from the system. If these gases are not purged from the system they can blanket off a portion of the condenser or the absorber and the result would be a higher pressure in the system and a higher evaporator temperature.

The maximum efficiency of the system will be maintained if the gases are properly removed from the medias before charging the system in accordance with this invention.

Other objects and advantages of the invention will appear in the course of the following description.

The drawing illustrates the best mode presently contemplated of employing the invention.

Figure 2:
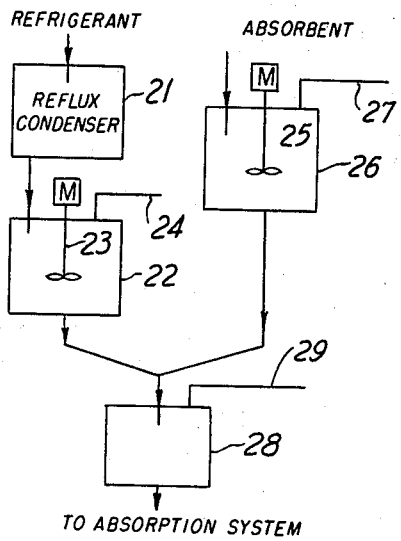

Figure 1 is a diagrammatic representation of a continuous absorption refrigeration system in which the refrigerant and the absorbent solution of the invention can be utilized; and Fig. 2 is a diagrammatic flow sheet illustrating the process of treating the refrigerant and the absorbent before the same are charged into the absorption system.

Referring to the drawing, the absorption system is of conventional construction and includes a generator 1, separator 2, condenser 3, evaporator 4, absorber 5, and a heat exchanger 6.

In operation of the system, the solution which is rich in refrigerant is heated in the generator 1 by a suitable heating unit such as a gas burner 7. Heating the rich mixture vaporizes the refrigerant, and the refrigerant vapor will then lift the solution, thus made weak in refrigerant, upwardly through pipe 8 to separator 2 where the weak solution is separated from the refrigerant vapor and passes through conduit 9 to the heat exchanger 6.

After passing through heat exchanger 6, the weak solution moves through conduit 10 to the absorber 5.

The refrigerant vapor passes from the separator 2 through conduit 11 to condenser 3 where the vapor is cooled and liquified by passing in heat exchange relation with a cooling medium such as water which enters condenser 3 through conduit 12 and is discharged from the condenser through conduit 13.

The liquid refrigerant then passes through conduit 14 to the evaporator 4. Pressure reducing means, such as a capillary tube or expansion valve 15 is disposed in conduit 14 adjacent the entry to the evaporator. The refrigerant vaporizes in the evaporator by absorbing heat from a stream of air which is blown across the evaporator by blower 16 and the cooled air is then conducted to the location to be cooled.

The refrigerant vapor passes from the evaporator to the absorber 5 through conduit 17, and the refrigerant vapor is absorbed by the weak solution which is introduced into the absorber through conduit 10. A cooling medium is passed through a coil 18 in the absorber in heat transfer relation with the solution and the refrigerant vapor is absorbed by the solution making the solution rich.

The rich solution then passes from the absorber through conduit 19 to the heat exchanger where it is preheated and then is returned to the generator through conduit 20.

As shown in the drawing, the flow of the absorbent solution and refrigerant through the system is accomplished by means of hydrostatic legs. However, a pump may be incorporated in the system depending on the particular materials employed and the practical height limits of the system.

According to the invention, the working medium consists of about 20% to 60% by weight of the refrigerant and the balance absorbent solution. These materials are compatible with each other, have the necessary chemical affinity so that the refrigerant will be readily absorbed in the absorbent, and shall have a negative deviation from Raoult's law. The following materials may be used in the system:

| Refrigerant | Absorbent |
|---|---|
| Ammonia | Ammonium thiocyanate. |
| Toluol | Paraffin oil. |
| Methylamine | Ethylene Glycol. |
| Methylene chloride | Dichloro benzene. |
| Methanol | Lithium bromide. |
| Methylene chloride | Tetraethylene glycol dimethyl ether. |
| Cichloromonofluoromethane (Freon 21). | Do. |
| Trichloroethane | Propyl bromide. |
| Trichloroethylene | Tetraethylene glycol dimethyl ether. |
| Do | "Alkazine" 42-$BrC_6H_3C_2H_5$. |
| Chlorodifluoromethane (Freon 22) | Diethylene glycol dimethyl ether. |

In order to maintain the proper total vapor pressure of the materials it is critical that both the absorbent and the refrigerant be substantially free of moisture and gases. It has been found that the moisture content of the mixture should be less than 40 parts per million (0.004% by weight) of the mixture. Similarly, the air content in both the refrigerant and absorbent, and thus the mixture, should be less than 0.1 ml. per liter of refrigerant, absorbent or mixture, respectively.

The following methods and figures refer to trichloroethylene as the refrigerant and tetraethylene glycol dimethyl ether as the absorbent. The procedure can be used for any combinations within the scope of the invention. In a weight relation, the air content in the refrigerant should not exceed 0.0000089% by weight or 0.089 p.p.m. by weight and the air content of the absorbent should not exceed 0.0000128% by weight or 0.128 p.p.m. by weight. These figures are based on the density of air as 1.2929 gr./liter at 0° C. and 76 mm. and a specific gravity of trichloroethylene of 1.46 and a specific gravity of tetraethylene glycol dimethyl ether of 1.01 at a temperature of 20°/4° C.

The moisture and dissolved or absorbed gas contents of the refrigerant and absorbent are reduced to below the above limits by conventional dehydrating and degasifying procedures. For example, when using a system having trichloroethylene as the refrigerant and tetraethylene glycol dimethyl ether as the absorbent, the trichloroethylene may be conveniently dehydrated by refluxing through anhydrous calcium sulphate in a reflux condenser 21. The reflux condenser operates at a solution temperature of about 18° C. to 22° C. and at a pressure of 40 to 50 mm. of mercury. With this procedure an 18 liter quantity of trichloroethylene will be dehydrated in about 24 hours.

After refluxing, which removes substantially all of the moisture and a portion of the dissolved gases, the trichloroethylene is transferred to a sealed vessel 22 where further degasifying is accomplished by agitating the material with a magnetic stirrer 23 while drawing a vacuum of about 50 microns on the material through line 24 for about 5 minutes. This procedure results in the moisture and dissolved gas content of the trichloroethylene being reduced to a value of about 10 p.p.m. of moisture and 0.01 p.p.m. of dissolved gas.

In regard to the tetraethylene glycol dimethyl ether, this material can be dehydrated and degasified by heating to about 110° C. while agitating with a magnetic stirrer 25 in a sealed vessel 26. A vacuum of about 50 microns is drawn on the material through line 27 while heating and agitating. The time required for this procedure may vary widely due to the wide variation in the moisture content of the material as received.

After the above treatment the tetraethylene glycol dimethyl ether can be further degasified by the above process but without heating. This results in the material having a moisture content of about 20 p.p.m. and a dissolved gas content of about 0.01 p.p.m.

The absorbent and refrigerant are then mixed together in a sealed container 28 under a vacuum drawn through line 29 and the mixture subsequently charged into the absorption system.

The commercially available refrigerants and absorbents may contain small amounts of stabilizing agents which increase the longevity of the materials and prevent the decomposition of the same at the temperatures and conditions of operation. These stabilizing agents are commonly known in the art, and thus it is assumed that the refrigerants and absorbents specified will contain a small amount of the stabilizing agents.

The present invention provides a process for treating a refrigerant mixture for an absorption system which will maintain the required vapor pressure of the absorbent and refrigerant for substantially indefinite periods.

Various modes of carrying out the invention are contemplated as being within the scope of the following claims particularly pointing out and distinctly claiming the subject matter which is regarded as the invention.

We claim:

1. In a method of circulating a working mixture of an absorbent and a refrigerant in an absorption system, the improvement comprising separately dehydrating and degasifying the refrigerant and the absorbent to reduce the moisture content of each to a value less than 0.004% by weight of the mixture and to reduce the dissolved gas content of each to a value less than 0.1 milliliter of dissolved gas per liter, mixing the dehydrated and degasified refrigerant and the absorbent together under vacuum in a weight ratio of 20% to 60% of said refrigerant and the balance absorbent, and passing the dehydrated and degasified mixture into the absorption system under vacuum.

2. In a method of circulating a working mixture of an absorbent and a refrigerant in an absorption system, the improvement consisting of dehydrating and degasifying the working mixture to reduce the moisture content of the mixture to a value of less than 0.004% by weight of the mixture and reduce the dissolved gas content of the mixture to a value less than 0.1 milliliter of said mixture, and passing the dehydrated and degasified mixture into the absorption system under vacuum.

References Cited in the file of this patent

UNITED STATES PATENTS

| Number | Name | Date |
|---|---|---|
| 1,685,764 | Carl et al. | Sept. 25, 1928 |
| 1,790,757 | Miller | Feb. 3, 1931 |
| 1,991,465 | Miller et al. | Feb. 19, 1935 |
| 2,136,790 | Fleischer | Nov. 15, 1938 |
| 2,149,947 | Zellhoefer | Mar. 7, 1939 |

OTHER REFERENCES

Air Conditioning and Refrigeration Data Book, 1956–1957, pp. 38–03, Table 2.